US005303781A

United States Patent [19]

Lin

[11] Patent Number: 5,303,781

[45] Date of Patent: Apr. 19, 1994

[54] PNEUMATIC TOOL

[75] Inventor: Chen-Yang Lin, Tainan, Taiwan

[73] Assignee: Wunli Pneumatic Tools Co., Ltd., Tainan, Taiwan

[21] Appl. No.: 75,632

[22] Filed: Jun. 10, 1993

[51] Int. Cl.[5] ........................ B23B 45/04; F16K 11/14

[52] U.S. Cl. .................................................... 173/169

[58] Field of Search ........................ 173/169, 170, 168; 91/31, 461; 251/39; 137/637.2

[56] References Cited

U.S. PATENT DOCUMENTS 3,037,740 6/1962 Sheps et al. ......................... 173/169
3,326,240 6/1967 McConnaughay ................. 173/169
3,510,099 5/1970 Crump ............................... 173/169
3,924,693 12/1975 Whitehouse ........................ 173/169
4,024,892 5/1977 Prisco et al. ........................ 173/169
4,776,561 10/1988 Braunlich et al. .................. 173/169

*Primary Examiner*—Scott Smith
*Attorney, Agent, or Firm*—Christie, Parker & Hale

[57] ABSTRACT

A pneumatic tool includes a tool housing which is provide with a pneumatic driving unit. The handle of the tool housing has a horizontal blind bore formed therein. An air flow regulating ring for regulating air flow into the interior of the tool housing to activate the driving unit, an air direction control unit for controlling the direction of air flow to the driving unit so as to control the rotation of the driving unit, and a control rod for controlling air flow into the tool housing, are disposed axially inside the blind bore.

6 Claims, 7 Drawing Sheets

PNEUMATIC TOOL

BACKGROUND OF THE INVENTION

1. Field Of The Invention

This invention relates to a pneumatic tool, more particularly to a pneumatic tool which is easy to operate and which can be manufactured and assembled conveniently.

2. Description Of The Related Art

Referring to FIG. 1, a conventional pneumatic wrench is shown to comprise a main body (1) which has a hollow body part (11) with an open front end and an open rear end (111). A pneumatic driving unit (12) is received in the body part (11) and has a driving shaft that extends out of the body part (11) via the front end of the latter. The open rear end (111) of the body part (11) has a cover member (13) mounted securely thereon. The cover member (13) is formed with a first air intake guiding slot (131) and a second air intake guiding slot (132), both of which are communicated with the body part (11) so as to guide air flow into the interior of the body part (11). The main body (1) further includes a handle part that extends downwardly from the body part (11). The handle part has a horizontal positioning passage (14) provided at the junction of the body part (11) and the handle part, an air intake passage (15) that extends downwardly from the positioning passage (14), a sliding passage (16) that intersects with the air intake passage (15), a recess (17) that is formed in a front surface of the handle part and that is communicated with the sliding passage (16), and an air intake mouth (18) provided in a bottom surface of the handle part and communicated with the air intake passage (15). An air flow direction control unit (21) includes a hollow tubular member (211) which is positioned in the positioning passage (14). The hollow tubular member (211) has a radial hole (212) which is communicated with the air intake passage (15). The hollow tubular member (211) further has a first vent (216) and a second vent (217) formed radially on the periphery thereof at two sides of the radial hole (212). A control rod (213) is disposed movably in the tubular member (211) and has a first diameter-reduced portion (214) formed at one end portion thereof and a second diameter-reduced portion (215) formed at the other end portion thereof. The control rod (213) is movable between a first position, wherein the first diameter-reduced portion (214) is communicated with the first vent (216) and the second vent (217) is blocked, and a second position, wherein the second diameter-reduced portion (215) is communicated with the second vent (217) and the first vent (216) is blocked. The first vent (216) is communicated with the first guiding slot (131) in the cover member (13) via a first connecting passage (not shown) which is formed in the body part (11) of the main body (1). Similarly, the second vent (217) is communicated with the second guiding slot (132) in the cover member (13) via a second connecting passage (141) which is formed in the body part (11) of the main body (1). An air flow regulating assembly (22) includes an air flow regulating ring (222) disposed axially and fittingly inside the air intake passage (15) and formed with a plurality of differently-sized angularly spaced radial holes (223). A rotary knob (221) is mounted rotatably on the bottom surface of the handle part and is connected securely to the regulating ring (222) so that the rotary knob (221) is operable to align one of the radial holes (223) in the regulating ring (222) with the air intake mouth (18). A trigger assembly (23) includes a trigger rod (231) which is disposed movably and fittingly in the sliding passage (16), a trigger piece (232) which is mounted movably on the front surface of the handle part and which is connected securely to one end of the trigger rod (231), and a coupling head (233) which is mounted securely on the bottom surface of the handle part to communicate the air intake mouth (18) with an air source (not shown). The coupling head (233) has a spring unit (234) disposed therein, a steel ball unit (235) disposed in the coupling head (233) and biased by the spring unit (234) to block the coupling head (233), and a washer (236) to position the steel ball unit (235) in the coupling head (233).

When the driving unit (12) is operated to rotate in a counterclockwise direction and the amount of air intake is maximum, the control rod (213) is in the second position, and the radial hole (223) with the greatest diameter in the regulating ring (222) is communicated with the air intake mouth (18). The steel ball unit (235) is pushed by the trigger rod (231) to compress the spring unit (234) of the coupling head (233) when the trigger piece (232) is pressed to move the trigger rod (231) so as to permit air flow from the air source through the coupling head (233) into the air intake mouth (18) via the gap formed between the washer (236) and the steel ball unit (235). Air then flows into the air intake passage (15) via the regulating ring (222), through the connecting passage (141) in the body part (11) via the radial hole (212) in the tubular member (211) and the second diameter-reduced portion (215) of the control rod (213), and into the interior of the body part (11) via the second guiding slot (132) in the cover member (13) so as to activate the driving unit (12) to rotate the driving shaft in the counterclockwise direction. When the driving shaft of the driving unit (12) is to be rotated in a clockwise direction, the control rod (213) is moved to the first position. At this stage, air flows into the body part (11) via the first guiding slot (131) in the cover member (13) when the trigger piece (232) is pressed, thus activating the driving unit (12) to drive the driving shaft to rotate in the clockwise direction.

To vary the amount of air intake, the rotary knob (221) is operated to rotate the regulating ring (222) so as to align the air take mouth (18) with a differently-sized radial hole (223') in the regulating ring (222). When the trigger piece (232) is released, the spring unit (234) biases the steel ball unit (235) to block the coupling head (233) so as to stop air flow through the air intake mouth (18). The main body (1) further includes an air outlet (not shown) so as to permit the flow of air from the body part (11). Since the structure of the air outlet is not related directly to the present invention, a description thereof will be omitted for brevity.

Although, the above-described conventional pneumatic tool is effective, the assembly of the same is relatively complicated. To assemble the air flow direction control unit (21), the air flow regulating assembly (22) and the trigger assembly (23) in the main body (1), a plurality of air passages must be formed in the main body (1). Since the air passages are communicated with each other, and since the relative position of the air passages is complicated, precise machining of the main body (1) must be processed.

Therefore, the main drawback of the above-described convention pneumatic tool is that the manufacture and assembly thereof is time-consuming and relatively complicated.

SUMMARY OF THE INVENTION

The main object of this invention is to provide a pneumatic tool that is easy to operate and that can be manufactured and assembled.

According to this invention, a pneumatic tool includes a tool housing, a pneumatic driving unit, an air flow regulating ring, an air direction control unit, an elongated control rod, a rotary flow control knob, a trigger piece and a spring unit. The tool housing includes a hollow main body and an upright handle which extends downwardly from the main body and which has a front surface and a horizontal blind bore that is accessible from the front surface. The blind bore has an inner portion and an outer portion. The handle further has an air intake passage which extends downwardly from the inner portion of the blind bore, and two air holes which communicate the outer portion of the blind bore and an interior of the hollow main body. The pneumatic driving unit is provided in the main body. The air flow regulating ring is disposed axially and fittingly inside the inner portion of the blind bore and is formed with a plurality of differently-sized angularly spaced radial holes. The air direction control unit includes an annular member which is disposed axially and rotatably inside the blind bore and which has an inner end, an axial through hole, and a radial passage communicated with the axial through hole. The annular member further has an inner wall surface which defines the axial through hole, and an outer end that extends out of the blind bore and that is provided with an activating arm which is operable so as to rotate the control unit in order to align the radial passage and a selected one of the air holes and to block the other one of the air holes. The elongated control rod extends into the axial hole and has a diameter-reduced first end portion that extends into the regulating ring. The first end portion is provided with a piston and is coupled with the regulating ring. The control rod further has a second end portion that extends out of the axial through hole of the control unit. The first end portion of the control rod and the inner wall surface of the annular member of the control unit cooperatively define an annular clearance therebetween. The rotary flow control knob is sleeved on the control rod and is operable so as to rotate the control rod in order to rotate correspondingly the regulating ring to align a selected one of the radial holes with the air intake passage. The trigger piece is connected to the second end of the control rod and is operable to move the piston away from the inner end of the control unit to permit air flow from the inner portion to the clearance. The spring unit is disposed between the trigger piece and the control knob so as to bias the trigger piece to move the control rod in order to permit the piston to block normally the inner end.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
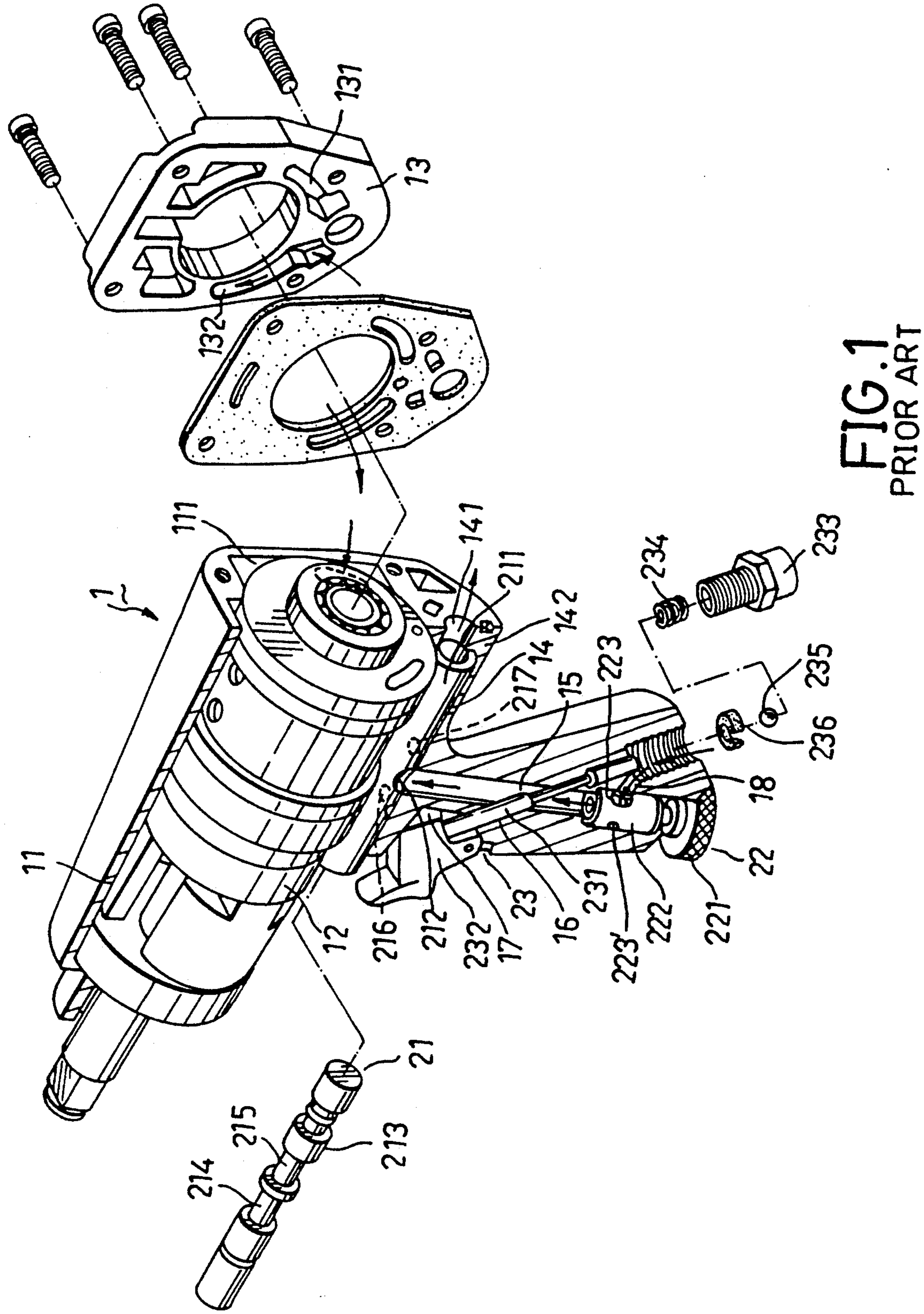
FIG.1 PRIOR ART
FIG. 1 is a partly exploded view showing a conventional pneumatic tool.
Figure 2:
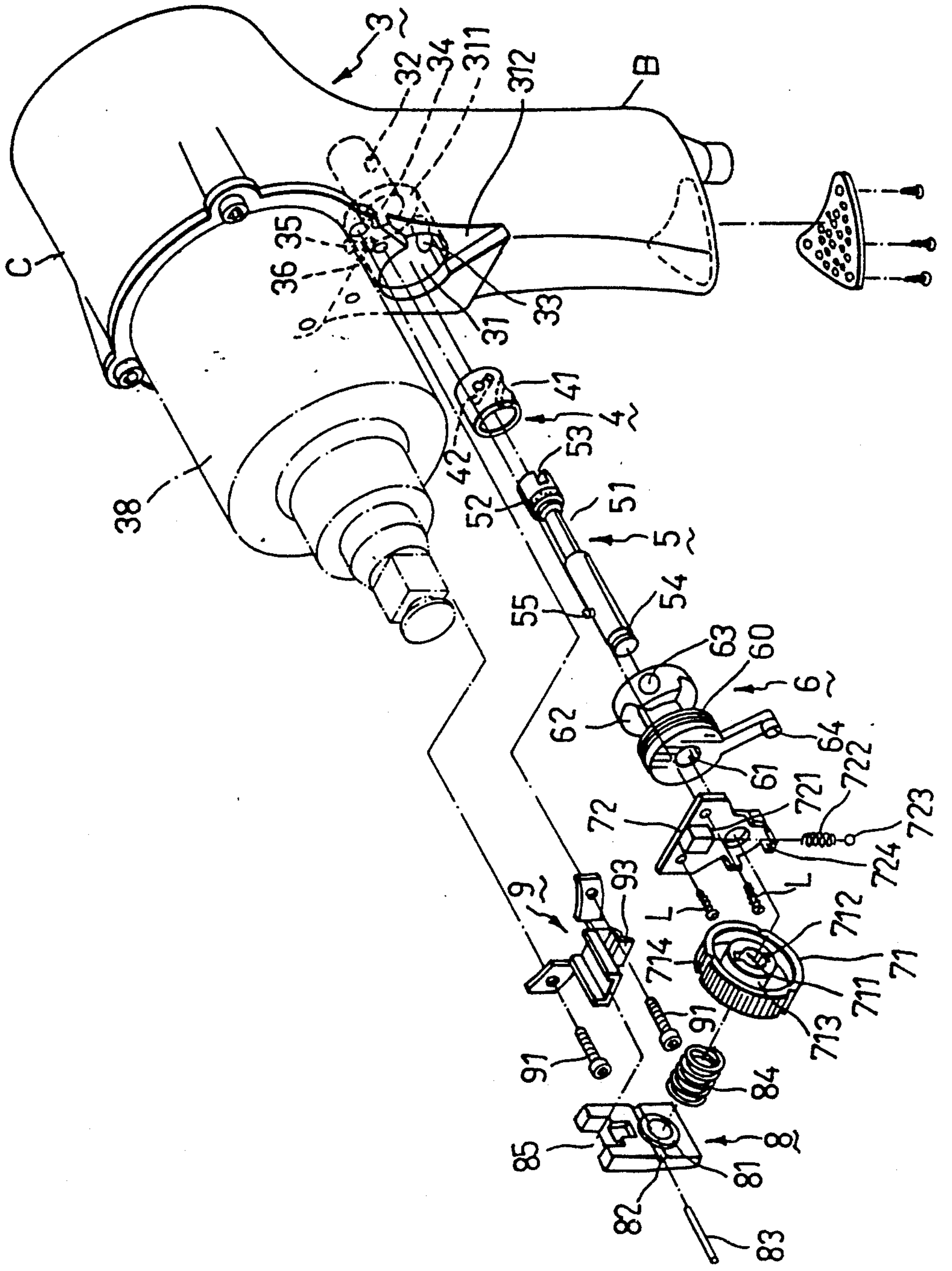
FIG. 2 is a partly exploded view showing a pneumatic tool according to the present invention.
Figure 3:
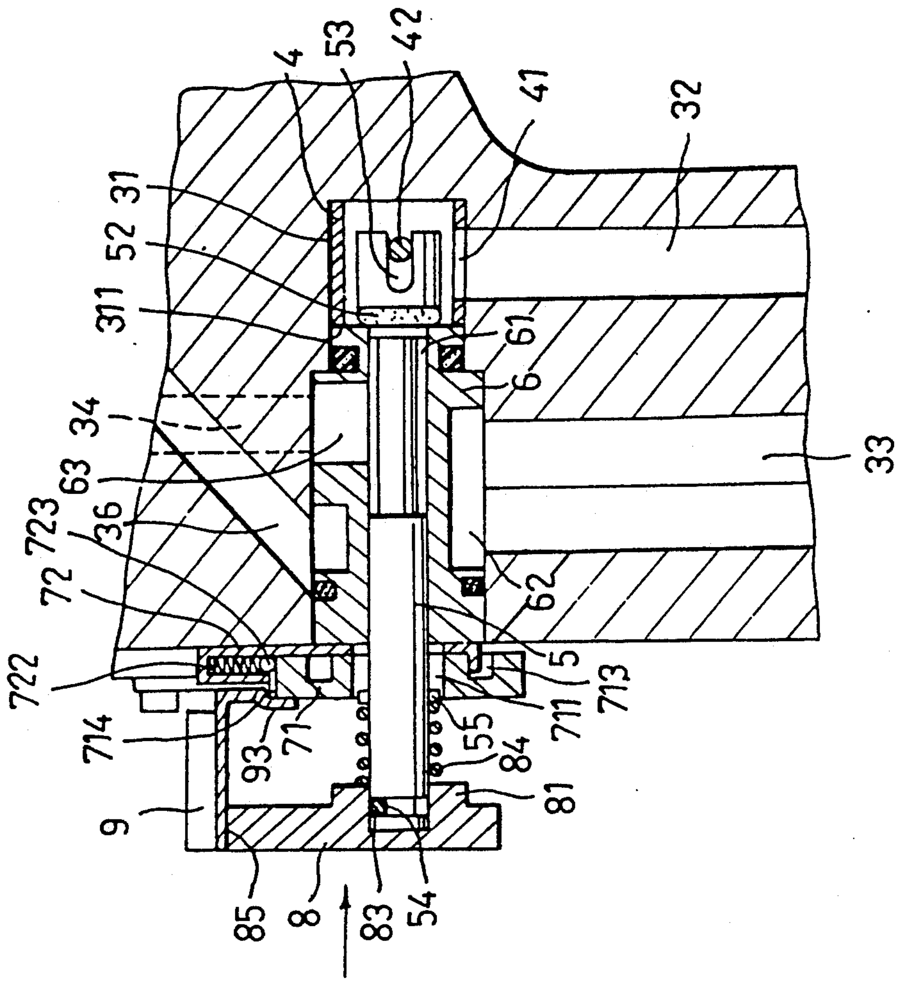
FIG. 3 is a fragmentary, partly sectional view of the pneumatic tool according to the present invention.
Figure 4:
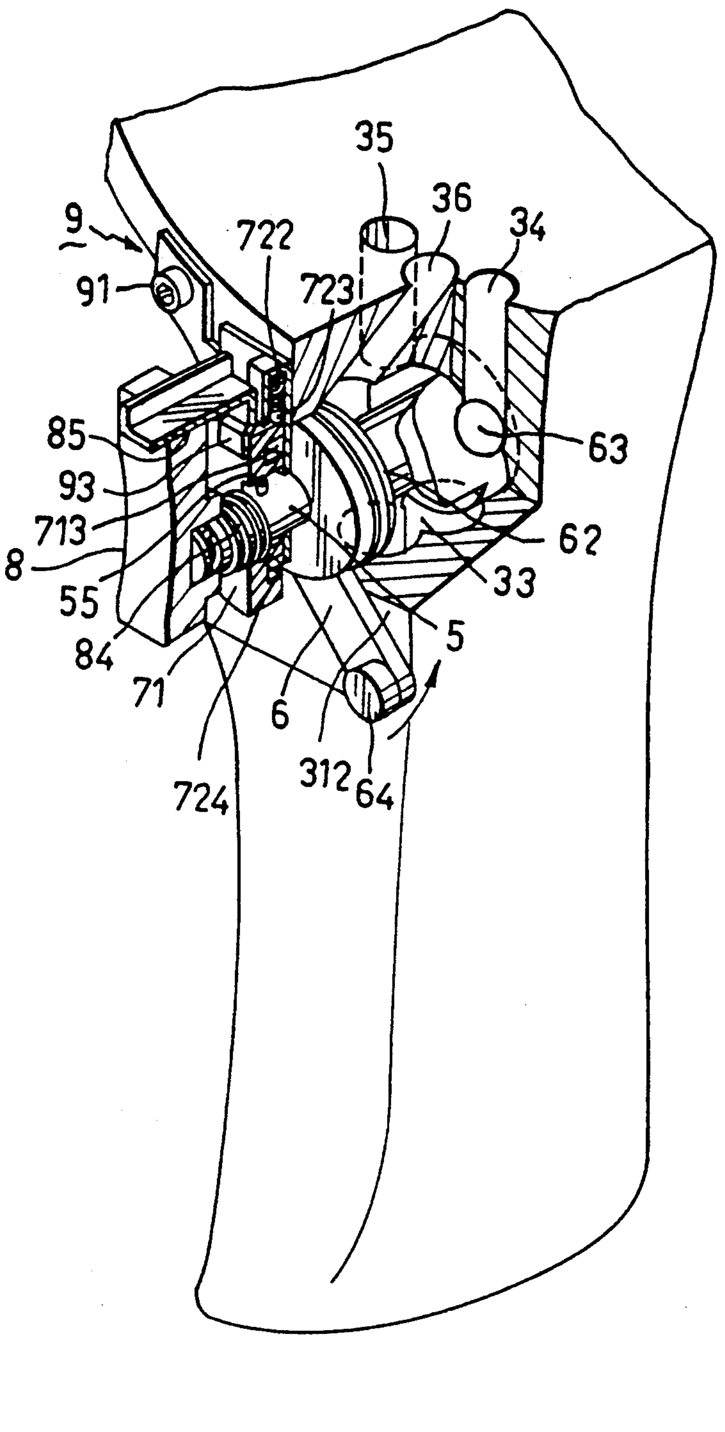
FIG. 4 is a fragmentary cut away perspective view showing the pneumatic tool according to the present invention.

Referring to FIGS. 2, 3 and 4, a pneumatic tool according to this invention includes a tool housing (3), a pneumatic driving unit (38), an air flow regulating ring (4), an air direction control unit (6), an elongated control rod (5), a rotary flow control knob (71), a trigger assembly (8), a spring unit (84) and a locating plate (9).

The tool housing (3) includes a hollow main body (C) and an upright handle (B) which extends downwardly from the main body (C) and which has a front surface and a horizontal blind bore (31) that is accessible from the front surface. The blind bore (31) has an inner portion and an outer portion so as to form a shoulder portion (311) at the junction of the inner and outer portions of the blind bore (31). The handle (B) further has an air intake passage (32) which extends downwardly from the inner portion of the blind bore (31) to the bottom surface thereof, and two air holes (34, 35) which extend upwardly from the outer portion of the blind bore (31) so as to communicate the outer portion of the blind bore (31) and an interior of the hollow main body (C). An air outlet hole (36) is formed in the handle (B) and communicates the interior of the main body (C) and the outer portion of the blind bore (31). An air outlet passage (33) extends downwardly from the outer portion of the blind bore (31).

The pneumatic driving unit (38) is provided in the main body (C) and has a driving shaft that extends frontwardly therefrom.

The air flow regulating ring (4) is disposed axially and fittingly inside the inner portion of the blind bore (31) and is formed with a plurality of differently-sized angularly spaced radial holes (41). The regulating ring (4) further has a diametrical rod (42) disposed securely therein.

The air direction control unit (6) includes an annular member (60) disposed axially and rotatably inside the outer portion of the blind bore (31) and has an axial through hole (61), an inner end, an outer end, and an annular groove (62) formed in the annular member (60) between the inner end and the outer end of the latter. The annular groove (62) communicates the air outlet hole (36) with the air outlet passage (33) in the handle (B) so as to permit air flow from the interior of the main body (C) via the air outlet hole (36), the groove (62) and the air outlet passage (33). The annular member (60) further has a radial passage (63) which is formed in the periphery of the inner end thereof and which is communicated with the axial through hole (61), and an inner wall surface which defines the axial through hole (61). The outer end of the annular member (61) extends out of the blind bore (31) and is provided with an activating arm (64) which is operable so as to rotate the control unit (6) in order to align the radial passage (63) and a selected one of the air holes (34, 35) and to block the other one of the air holes (34, 35). A limiting means is formed in the front surface of the handle (B) and includes a protuberance (312) which protrudes frontwardly from the front surface of the handle (B) around the second end of the annular member (60) and which has two ends that cooperatively restrict the movement of the activating arm (64) of the annular member (60) therebetween so as to limit the angular movement of the annular member (60).

The elongated control rod (5) extends into the axial hole (61) and has a diameter-reduced first end portion (51) extending into the regulating ring (4). The first end portion (51) is provided with a piston (52) which has a claw portion (53) that is away from the first end portion (51) of the control rod (5). The claw portion (53) engages the diametrical rod (42) of the regulating ring (4) in a slidable manner so as to permit axial movement of the control rod (5) relative to the regulating ring (4) and so as to rotate the regulating ring (4) when the control rod (5) is rotated. The control rod (5) further has a second end portion which extends out of the axial through hole (61) in the annular member (60) of the control unit (6) and which has an annular groove (54) formed therein. The first end portion (51) of the control rod (5) and the inner wall surface of the annular member (60) of the control unit (6) cooperatively define an annular clearance therebetween. The control rod (5) further has two diametrically opposite projections (55) which project radially from the second end portion thereof.

The rotary flow control knob (71) has a tubular sleeve portion with an annular inner wall which defines an axial hole (711) and which has two diametrically opposite notches (712) communicated with the axial hole (711) of the sleeve portion. The control knob (71) is sleeved on the second end portion of the control rod (5) in such a manner that the projections (55) of the control rod (5) engage the notches (712) in the sleeve portion of the control knob (5). Thus, the control rod (5) rotates synchronously with the control knob (71) when the latter is rotated. The sleeve portion and an inner wall of the control knob (71) cooperatively define an annular groove (713) therebetween. The control knob (71) has a plurality of angularly spaced positioning grooves (714) which are formed in an outer surface thereof and which correspond to the radial holes (41) of the regulating ring (4). A positioning plate (72) is mounted on the front surface of the handle (B) between the control knob (71) and the handle (B) by means of two bolts (L) which extend through the positioning plate (72) and into the handle (B). The positioning plate (72) is provided with a spring-loaded retractable protrusion and a plurality of frontwardly protruding and angularly spaced protrusions (724) at a front surface thereof. The protrusions (724) extend into the annular groove (713) in the control knob (71). The spring-loaded retractable protrusion includes a spring (722) disposed in a projection (721) which projects frontwardly from the front surface of the positioning plate (72) above the control knob (71) and which has a recess that is accessible from a bottom wall of the projection (721). A positioning ball (723) is disposed in the recess in the projection (721) and is biased downwardly by the spring (722) so as to engage selectively one of the positioning grooves (714) in the control knob (71) when the latter is rotated.

The trigger piece (8) has an annular ring (81) provided on a rear surface thereof. An engaging groove

(82) is formed in the rear surface of the trigger piece (8) in such a manner that the second end of the control rod (5) extends through the annular ring (81) and engages the trigger piece (8). An engaging pin (83) extends into the groove (82) in the trigger piece (8) and engages a portion of the annular groove (54) in the second end of the control rod (5) so as to prevent disengagement of the control rod (5) and so as to permit rotation of the control rod (5) relative to the trigger piece (8). The trigger piece (8) has an upper end which has a sliding groove (85) formed therein.

The locating plate (9) is positioned on the front surface of the handle (B) by means of bolts (91) and extends forwardly from the front surface of the handle (B) above the trigger piece (8) so as to engage slidably the sliding groove (85) in the trigger piece (8) in order to prevent rotation of the trigger piece (8) with the control rod (5). The locating plate (9) has a limiting plate (93) extending downwardly therefrom and abutting against a front surface of the control knob (71) so as to prevent axial movement of the latter.

Referring to FIGS. 3 and 4, during assembly, the regulating ring (4) is disposed in the inner portion of the blind bore (31). The first end portion (51) of the control rod (5) extends into the blind bore (31) and engages the diametrical rod (42) of the regulating ring (4) by means of the claw portion (53). Then, the annular member (60) of the air direction control unit (6), the positioning plate (72), the control knob (71) and the spring unit (84) are sleeved on the control rod (5) in this order. The second end portion of the control rod (5) is coupled with the trigger piece (8) by means of the engaging pin (83). Lastly, the locating plate (9) is positioned. After assembly, one of the radial holes (41) in the regulating ring (4) is aligned with the air intake passage (32). The radial passage (63) of the annular member (60) is aligned with the air hole (34), while the air hole (35) is blocked. The trigger piece (8) is biased by the spring unit (84) away from the blind bore (31) so that the piston (52) of the control rod (5) abuts against the inner end of the annular member (60) of the control unit (6) in order to prevent air flow from the inner portion of the blind bore (31) to the clearance. The sliding groove (85) in the trigger piece (8) engages the locating plate (9). The positioning ball (723) of the spring-loaded retractable protrusion of the positioning plate (72) engages one of the positioning grooves (714) in the control knob (71).

Figure 5:
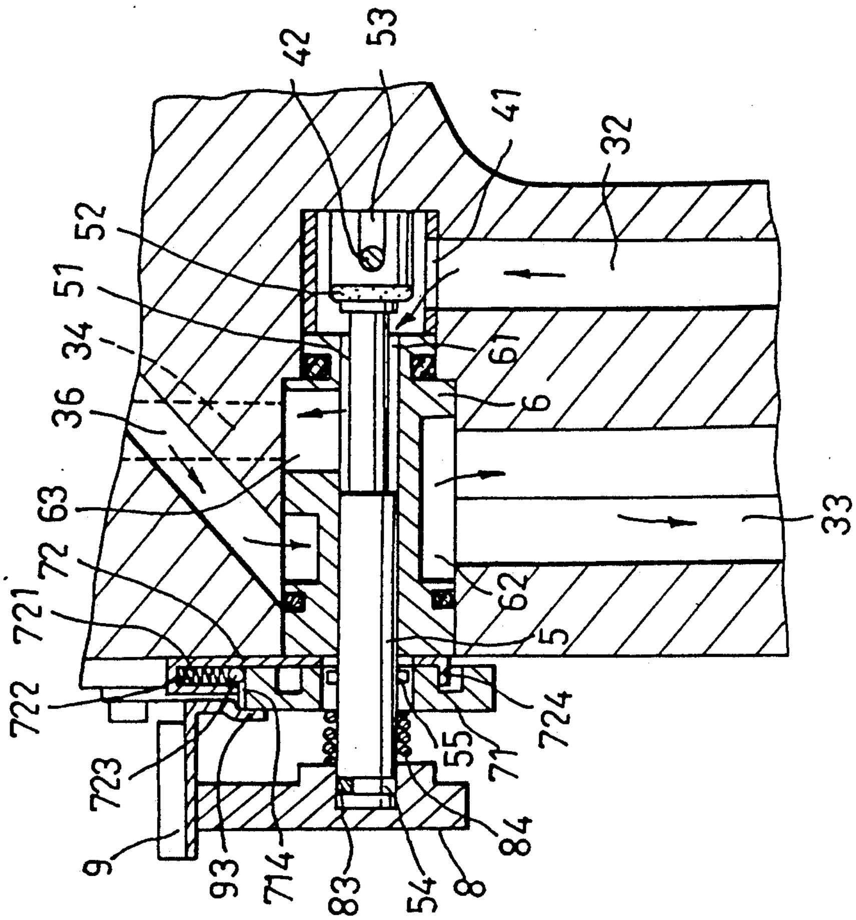
FIG. 5 is a fragmentary, partly sectional view of the pneumatic tool according to the present invention.
Figure 7:
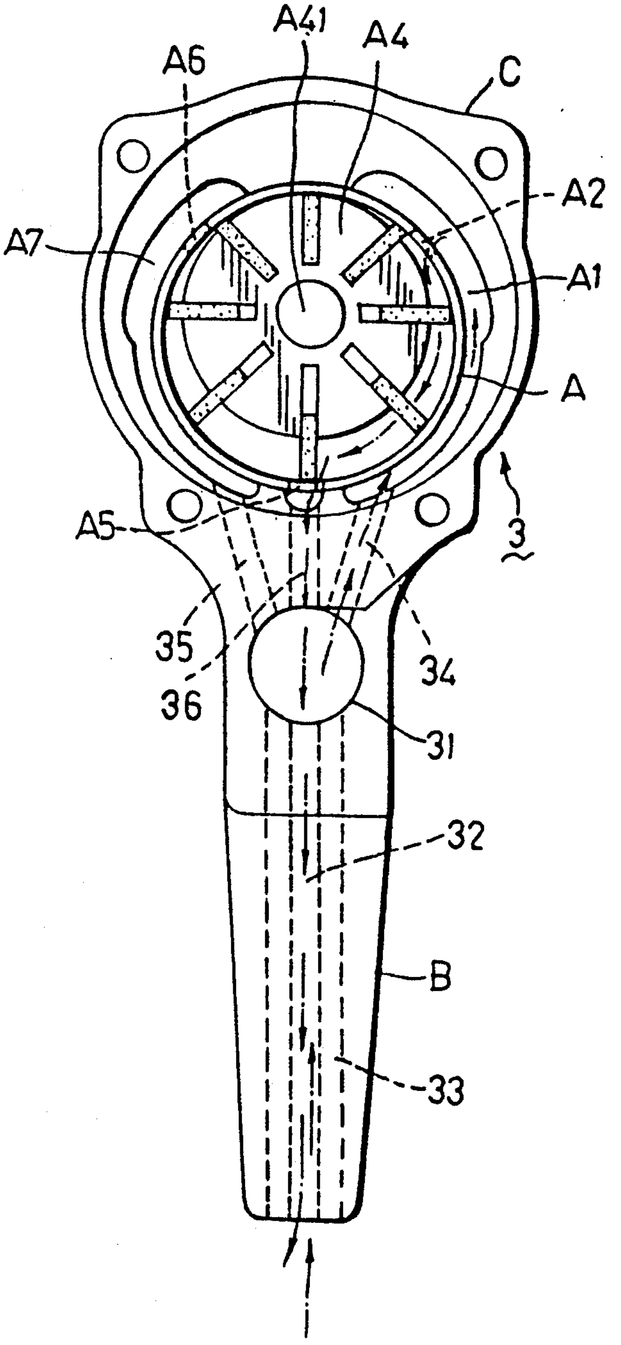
FIG. 7 is a rear side view showing the pneumatic tool according to the present invention.

Referring to FIGS. 3 and 5, when the pneumatic tool according to the present invention is operated, the trigger piece (8) is pressed to compress the spring unit (84) so as to move the piston (52) of the control rod (5) away from the inner end of the annular member (60) of the control unit (6) to permit air flow into the clearance via the air intake passage (32), the radial hole (41) in the regulating ring (4) registering with the intake passage (32), and the inner portion of the blind bore (32). Then, the air flows into the interior of the main body (C) via the air hole (34). As best shown in FIG. 7, a tubular seater (A) is provided in the interior of the main body (C) in a known manner in order that the pneumatic driving unit can be disposed therein. The seater (A) has a rear end surface which is formed with two guiding slots (A1, A7), two inlet holes (A2, A6) which are formed in the periphery of the seater (A) and which intercommunicates the interior of the main body (C) with the guiding slots (A1, A7) respectively, and an outlet vent (A5) which is formed in the periphery of the seater (A) and which intercommunicates the interior of the main body (C) and the outlet hole (36) in the handle (B). The air will flow from the air hole (34) into the interior of the main body (C) via the guiding slot (A1) and the inlet hole (A2) so as to rotate the rotor (A4) in a counterclockwise direction in order to activate the driving unit (38) to drive the shaft (A41) to rotate in the counterclockwise direction. The air will then flow from the interior of the main body (C) out of the tool housing (3) via the outlet vent (A5), the annular groove (62) in the annular member (60) and the outlet passage (33) in the handle (B). When the trigger piece (8) is released, the trigger piece (8) and the control rod (5) are biased by the spring unit (84) so that the piston (52) is moved toward the first end of the annular member (60) of the control unit (6) in order to prevent air flow through the intake passage (32).

Referring to FIGS. 4 and 7, when the shaft (A41) of the driving unit (38) is to be rotated in a clockwise direction, the activating arm (64) of the annular member (60) is operated to move angularly from one end of the protuberance (312) to the other end of the same so as to align the radial passage (63) with the air hole (35). At this stage, air will flow from the air hole (35) into the interior of the main body (C) via the guiding slot (A7) and the inlet hole (A6) so as to rotate the rotor (A4) in the clockwise direction in order to activate the driving unit (38) to drive the shaft (A41) to rotate in the clockwise direction. The air will then flow from the interior of the main body (C) out of the tool housing (3) as described above.

Figure 6:
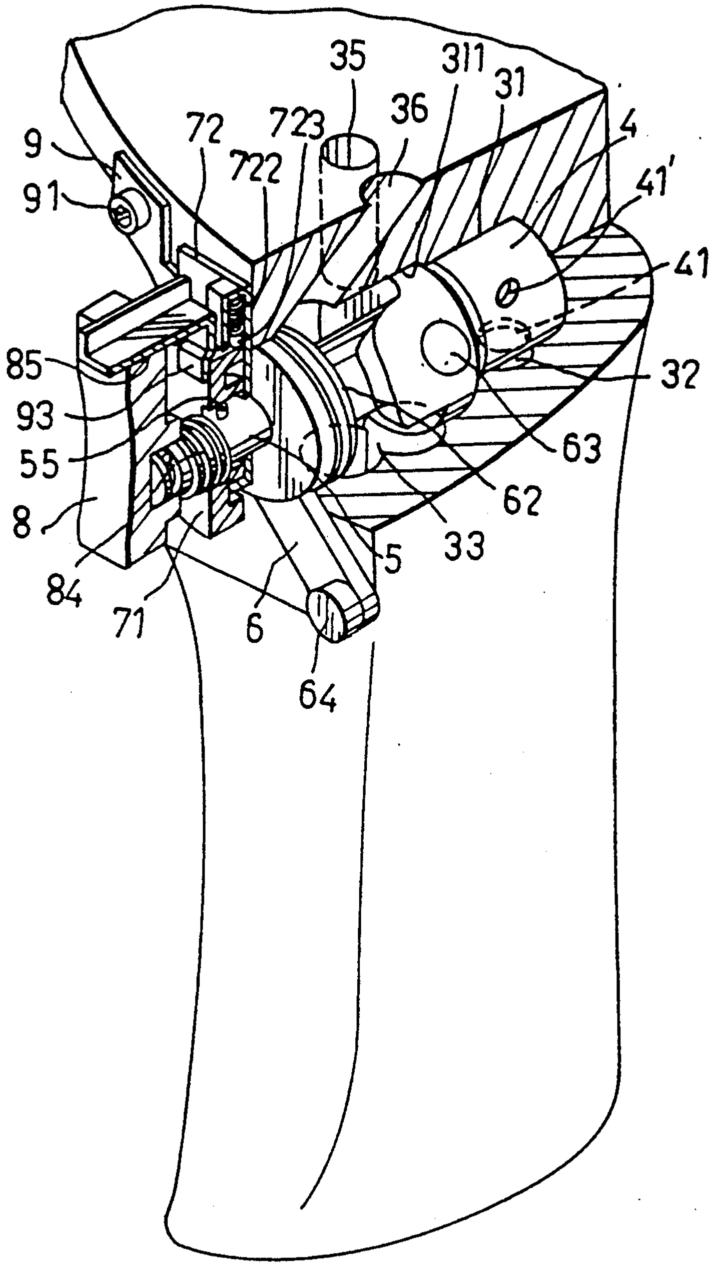
FIG. 6 is a fragmentary cut away perspective view of the pneumatic tool according to the present invention.

As illustrated in FIGS. 5 and 6, to regulate the flow of air, the control knob (71) is rotated so as to rotate the control rod (5) and the regulating ring (4) in order to align a differently-sized radial hole (41') with the air intake passage (32). The retractable protrusion of the positioning plate (72) engages a selected one of the grooves (714) in the control knob (71) corresponding to the selected one of the radial holes (41) in the regulating ring (4) so as to prevent untimely rotation of the knob (71) relative to the handle (B). Moreover, the trigger piece (8) is prevented from rotating with the control rod (5) due to the engagement of the sliding groove (85) in the trigger piece (8) and the locating plate (9).

Accordingly, since the pneumatic tool according to the present invention is provided with only one blind bore (31) to install the direction control unit, the air intake control and the regulating unit therein, the manufacture and the assembly of the present invention can be accomplished conveniently.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A pneumatic tool comprising:

a tool housing including a hollow main body and an upright handle which extends downwardly from said main body and which has a front surface and a horizontal blind bore accessible from said front surface, said blind bore having an inner portion and an outer portion, said handle further having an air intake passage which extends downwardly from said inner portion of said blind bore, and two air holes communicating said outer portion of said blind bore and an interior of said hollow main body;

a pneumatic driving unit provided in said main body;

an air flow regulating ring disposed axially and fittingly inside said inner portion of said blind bore and formed with a plurality of differently-sized angularly spaced radial holes;

an air direction control unit including an annular member which is disposed axially and rotatably inside said blind bore and which has an inner end, an axial through hole, and a radial passage communicated with said axial through hole, said annular member further having an inner wall surface which defines said axial through hole, and an outer end that extends out of said blind bore and that is provided with an activating arm which is operable so as to rotate said control unit in order to align said radial passage and a selected one of said air holes and to block the other one of said air holes;

an elongated control rod extending into said axial hole and having a diameter-reduced first end portion extending into said regulating ring, said first end portion being provided with a piston and being coupled with said regulating ring, said control rod further having a second end portion extending out of said axial hole of said control unit, said first end portion of said control rod and said inner wall surface of said annular member of said control unit cooperatively defining an annular clearance therebetween;

a rotary flow control knob sleeved on said control rod and operable so as to rotate said control rod in order to rotate correspondingly said regulating ring to align a selected one of said radial holes with said intake passage;

a trigger piece connected to said second end of said control rod and operable to move said piston away from said inner end of said control unit to permit air flow from said inner portion to said clearance; and a spring unit disposed between said trigger piece and said control knob so as to bias said trigger piece to move said control rod in order to permit said piston to block normally said inner end.

2. A pneumatic tool as claimed in claim 1, wherein said regulating ring further has a diametrical rod disposed securely therein, said piston of said control rod having a claw portion which is away from said first end portion of said control rod and which engages said diametrical rod in a slidable manner so as to permit axial movement of said control rod relative to said regulating ring and so as to rotate said regulating ring when said control rod is rotated.

3. A pneumatic tool as claimed in claim 1, wherein said control knob has a tubular sleeve portion with an annular inner wall which defines an axial hole and which has two diametrically opposite notches communicated with said axial hole of said sleeve portion, said control rod further having two diametrically opposite projections which project radially from said second end thereof and which engage said notches so that said control rod rotates synchronously with said control knob when said control knob is rotated.

4. A pneumatic tool as claimed in claim 1, wherein said control knob has an outer wall surface and a plurality of angularly spaced positioning grooves which are formed in said outer surface of said rotary knob and which correspond to said radial holes of said regulating ring, said pneumatic tool further comprising a positioning plate mounted on said front surface of said handle and provided with a spring-loaded retractable protrusion which engages selectively one of said positioning grooves in said control knob when said control knob is rotated.

5. A pneumatic tool as claimed in claim 1, wherein said handle is formed with a limiting means for limiting angular movement of said annular member of said air direction control unit.

6. A pneumatic tool as claimed in claim 1, wherein said handle has a locating plate extending forwardly from said front surface thereof above said trigger piece, said trigger piece having an upper end which has a sliding groove formed therein so as to engage slidably said locating plate.

* * * * *